US010782387B2

(12) United States Patent
Quellec et al.

(10) Patent No.: US 10,782,387 B2
(45) Date of Patent: Sep. 22, 2020

(54) METHOD FOR DELETING A SIGNAL COMING FROM AN ON-BOARD RADAR

(71) Applicant: THALES, Courbevoie (FR)

(72) Inventors: Jean-Michel Quellec, Brest (FR); Pascal Cornic, Brest (FR); Jean-Paul Artis, Brest (FR)

(73) Assignee: Thales, Courbevoie (FR)

(*) Notice: Subject to any disclaimer, the term of this patent is extended or adjusted under 35 U.S.C. 154(b) by 221 days.

(21) Appl. No.: 16/011,626

(22) PCT Filed: Jan. 4, 2017

(86) PCT No.: PCT/EP2017/050157
§ 371 (c)(1),
(2) Date: Jun. 18, 2018

(87) PCT Pub. No.: WO2017/118666
PCT Pub. Date: Jul. 13, 2017

(65) Prior Publication Data
US 2019/0086510 A1    Mar. 21, 2019

(30) Foreign Application Priority Data
Jan. 4, 2016  (FR) .................................... 16 00004

(51) Int. Cl.
*G01S 7/02* (2006.01)
*G01S 7/36* (2006.01)
*G01S 7/28* (2006.01)

(52) U.S. Cl.
CPC .............. *G01S 7/023* (2013.01); *G01S 7/021* (2013.01); *G01S 7/2813* (2013.01); *G01S 7/36* (2013.01)

(58) Field of Classification Search
CPC .......... G01S 7/023; G01S 7/021; G01S 7/027; G01S 7/2813; G01S 7/36; G01S 7/02;
(Continued)

(56) References Cited

U.S. PATENT DOCUMENTS 5,757,312 A * 5/1998 Szmurlo ................. G01S 7/038
342/159
6,727,840 B1   4/2004 Sullivan
(Continued)

OTHER PUBLICATIONS

Raghu, K. R., "Challenges of the Naval Electromagnetic Environment for the EMC Engineer," Electromagnetic Interference and Compatibility, Dec. 18, 2003, pp. 41-46, 8th International Conference on Chennai, India, Piscataway, NJ, USA.
(Continued)

*Primary Examiner* — Timothy X Pham
(74) *Attorney, Agent, or Firm* — Soquel Group LLC

(57) ABSTRACT

A method including providing a replica of a signal emitted by an on-board radar, receiving by a radar detector a signal, the received signal being the sum of a first signal depending on the signal emitted by the on-board radar and a second signal independent of the signal emitted by the on-board radar, the first signal being able to be represented by a linear combination of elementary signals each having an amplitude coefficient and a delay relative to the signal emitted by the on-board radar, processing the received signal, determining the amplitude coefficients and the delays of the elementary signals of the first signal relative to the signal emitted by the on-board radar, from the provided replica and the processed received signal, and eliminating, in the processed received signal, the first signal to obtain the second signal, from the provided replica.

9 Claims, 2 Drawing Sheets

Figure 1:
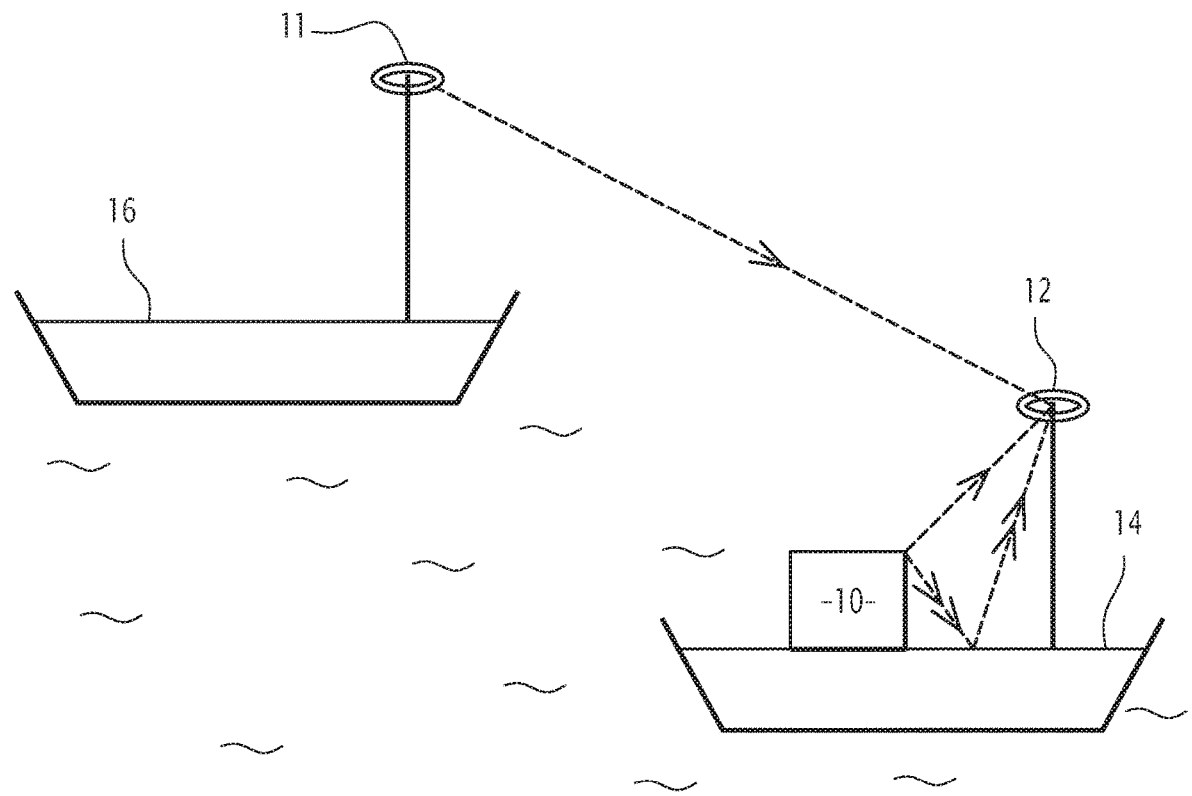

(58) Field of Classification Search
CPC .......... G01S 13/56; G01S 13/931; G01S 7/35;
G01R 27/28; G01R 31/021; G01N 22/00
USPC ....... 342/20, 91, 92, 93, 159, 162, 194, 195,
342/203, 346, 379, 380, 381, 382, 383,
342/384; 375/371
See application file for complete search history.

(56) References Cited

U.S. PATENT DOCUMENTS

| | | | |
|---|---|---|---|
| 7,843,375 | B1 | 11/2010 | Rennie et al. |
| 9,696,361 | B1* | 7/2017 | Sun ........................ G01R 27/28 |
| 2003/0125026 | A1* | 7/2003 | Tsunehara ............. H04W 64/00 |
| | | | 455/435.1 |
| 2007/0273997 | A1* | 11/2007 | Olson ................ G11B 5/00813 |
| | | | 360/69 |
| 2008/0219322 | A1 | 9/2008 | Hanna et al. |
| 2010/0135443 | A1* | 6/2010 | Lackey .................... H03D 1/04 |
| | | | 375/346 |
| 2010/0302091 | A1 | 12/2010 | Bruzzone et al. |
| 2012/0027401 | A1* | 2/2012 | Wood ........................ H04B 1/28 |
| | | | 398/9 |
| 2013/0094270 | A1* | 4/2013 | Kitsunezuka .......... H03D 7/163 |
| | | | 363/157 |

OTHER PUBLICATIONS

French Patent Application No. 16 00004, INPI Rapport de Recherche Préliminaire, mailed on Sep. 28, 2016, 3 pages.
PCT Application No. PCT/EP2017/050157, International Search Report, dated Apr. 12, 2017, 6 pages.

* cited by examiner

METHOD FOR DELETING A SIGNAL COMING FROM AN ON-BOARD RADAR

The present invention relates to a method for eliminating a signal coming from an on-board radar. The present invention also relates to a radar detector comprising an associated device for eliminating a signal coming from an on-board radar.

In the field of radar detectors, the emissions coming from on-board radars located on the same platform as the radar detector result in deteriorating the reception of the radar detector.

As a result, techniques have been developed for eliminating, at the radar detectors, the signals coming from on-board radars.

A first known method consists of increasing the uncoupling between the aerial of the interfering emitter and the aerial of the radar detector by masking using conducting or absorbing obstacles that prevent direct radiation between the two considered aerials.

However, such a method is limited in terms of performance due to the large possible number of coupling paths between the two aerials, for example coming from multiple reflections on the carrier platform of the aerials, or surface waves.

Another method, called blanking, using the established terminology, consists of interrupting the reception of the detector during a time interval temporally framing the emission of the interfering emitter.

However, during the interruption, the detector is inoperative, which may greatly deteriorate the performance of the detector in terms of likelihood of interception. This is even more true when the form factors of the radars tend to increase.

It is also known to use analog filtering techniques by inserting, at the input of each reception channel of the radar detectors, a rejector filter at the emission frequency of the interfering emitter.

Nevertheless, the sensitivity of the detector is deteriorated, on the working signals in the filtering band, by the value of the attenuation done by the rejector filter.

Other techniques using the principle of digital filtering are also known. Such techniques consist of performing postprocessing of the signal by rejecting the disrupted frequency bands at the presumed moments of the emission of the interfering emitter.

However, the detector is no longer able to detect the working signals in the rejected frequency bands, during the considered time intervals.

There is therefore a need to more effectively eliminate the signals emitted by the on-board radars located on the same platform as a radar detector.

To that end, the invention relates to a method for eliminating in a radar signal received by a radar detector belonging to a platform, a first signal coming from at least one on-board radar belonging to the same platform, the method comprising the following steps:

providing a replica of the signal emitted by the on-board radar, receiving by the radar detector a signal, the received signal being the sum of a first signal depending on the signal emitted by the on-board radar and a second signal independent of the signal emitted by the on-board radar, the first signal being able to be represented by a linear combination of elementary signals each having an amplitude coefficient and a delay relative to the signal emitted by the on-board radar, processing the received signal to obtain a processed received signal, determining the amplitude coefficients and the delays of the elementary signals of the first signal relative to the signal emitted by the on-board radar, the determining step being carried out from the provided replica and the processed received signal, and eliminating, in the processed received signal, the first signal to obtain the second signal, the eliminating step being carried out from the provided replica, the determined amplitude coefficients and the determined delays.

According to particular embodiments, the eliminating method comprises one or more of the following features, considered alone or according to all technically possible combinations:

the determining step comprises calculating a filter adapted to the signal of the on-board radar from the provided replica, the processed received signal, the adapted filter being a function whose extrema are the amplitude coefficients of the elementary signals of the first received signal.

the delays of the elementary signals of the first signal are the times of the corresponding amplitude coefficients.

the filter adapted to the on-board radar is given by the following function:

$$c(\Delta t) = \frac{\int_0^T S_T(t) \cdot [h(t - \Delta t)]^* dt}{\sqrt{\int_0^T |h(t - \Delta t)|^2 dt}}$$

Where:
$c(\Delta t)$ is a function of the variable $\Delta t$,
$h(t)$ is the replica provided for the emitted signal $E_1(t)$, expressed in complex representation,
$h(t)^*$ is the conjugated signal of the signal $h(t)$,
$S_T(t)$ is the processed received signal expressed in complex representation,
T is the sum of the duration of a representative pulse emitted by the on-board radar and the maximum reception delay on the radar detector of a pulse coming from the on-board radar,
$\int_0^T X.dt$ designates the integral of X on the variable t, t varying from 0 to T,
$|X|^2$ is the square of the modulus of X, and
$\sqrt{X}$ is the square root of X.

the determining step comprises comparing each determined amplitude coefficient to a predetermined threshold, the selected amplitude coefficients being greater than or equal to the predetermined threshold.

the replica for the provided emitted signal is a signal sampled at a sampling frequency, the processing step comprising sampling the received signal at the sampling frequency of the replica to obtain the processed received signal.

the eliminating step comprises a phase for calculating a cancellation signal from the determined amplitude coefficients, the determined delays and the provided emitted signal, the cancellation signal being an estimate of the first signal.

the eliminating step further comprises a phase for subtracting the cancellation signal, from the processed received signal delayed by an additional delay, the additional delay corresponding at least to the duration for carrying out the determining step and the calculating phase of the elimination step.

the providing, determining and eliminating steps of the elimination method are carried out for each on-board radar.

The invention also relates to a radar detector belonging to a platform, the radar detector being able to carry out a step for receiving a signal, the received signal being the sum of a first signal that depends on a signal emitted by at least one on-board radar belonging to the same platform, and a second signal independent from the signal emitted by the on-board radar, the first signal being able to be represented by a linear combination of elementary signals each having an amplitude coefficient and a delay relative to the signal emitted by the on-board radar, the radar detector further comprising an elimination device in the radar signal received by the radar detector, of the first signal, the device comprising a processor able to carry out the following steps:

processing the received signal to obtain a processed received signal, determining the amplitude coefficients and the delays of the elementary signals of the first signal relative to the signal emitted by the on-board radar, the determining step being carried out from the provided replica and the processed received signal, and eliminating, in the processed received signal, the first signal to obtain the second signal, the eliminating step being carried out from the provided replica, the determined amplitude coefficients and the determined delays.

Figure 2:
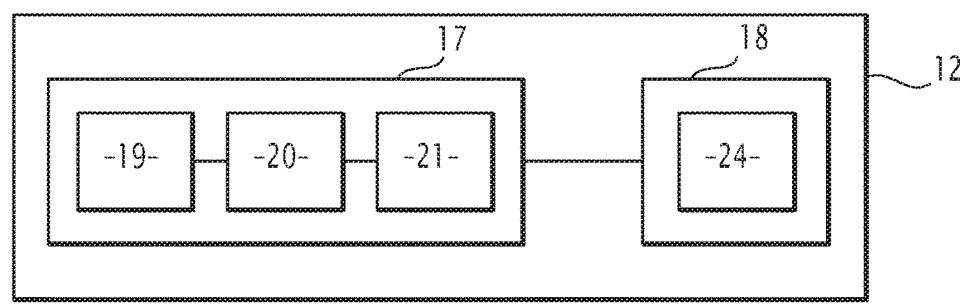
Figure 3:
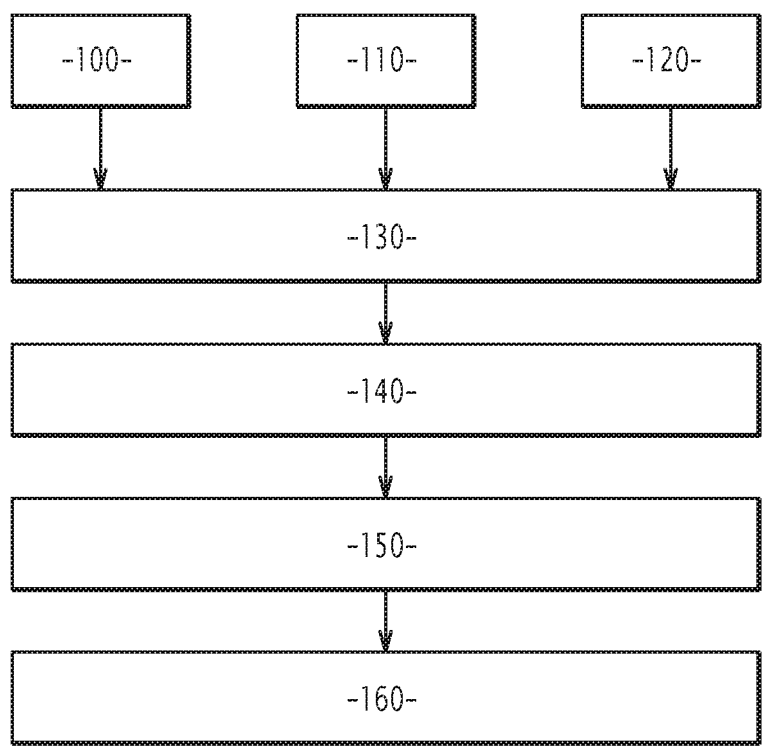
Figure 4:
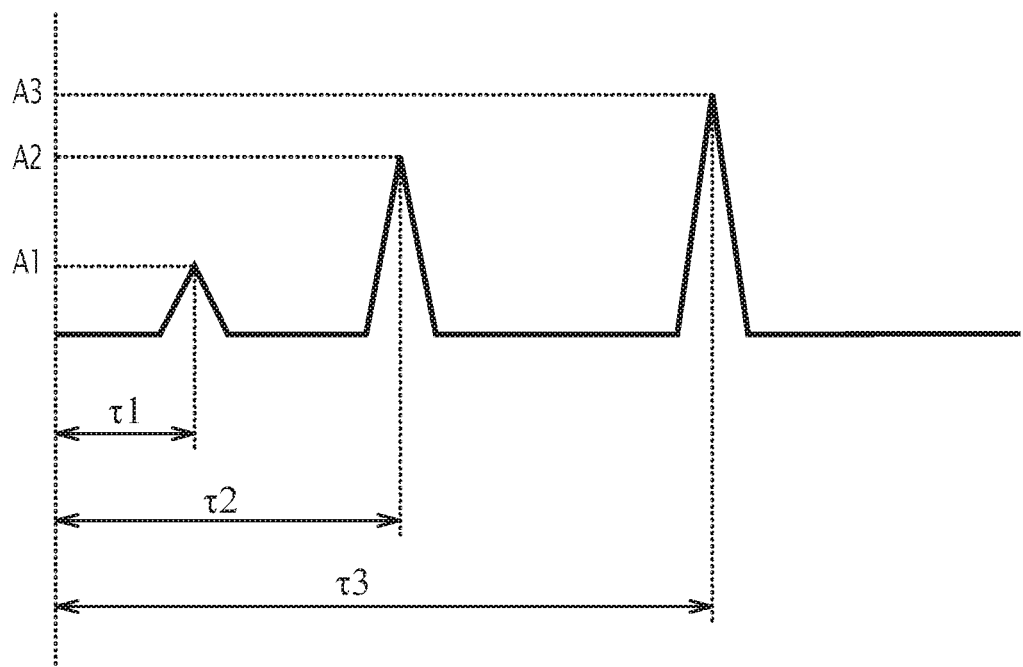

Other features and advantages of the invention will appear upon reading the following description of embodiments of the invention, provided solely as an example and in reference to the drawings, which are:

FIG. 1, a schematic view of an example of an on-board radar, a radar detector arranged on a platform and an outside radar arranged on another platform, FIG. 2, a functional schematic view of the elimination device of FIG. 1, FIG. 3, a flowchart of an example implementation of a method for eliminating a signal coming from an on-board radar, and FIG. 4, a graph showing the output of a filter adapted to the signal of the on-board radar.

An on-board radar 10, an outside radar 11 and a radar detector 12 are illustrated by FIG. 1.

The expression "on-board radar" designates a radar emitter located on a same platform as the radar detector 12 and the characteristics of which are known or communicated to the elimination device 18.

The expression "outside radar" refers to a radar emitter not located on the platform of the radar detector 12.

The on-board radar 10 and the radar detector 12 belong to a same platform 14. The platform 14 is, for example, a vehicle.

In the example illustrated by FIG. 1, the platform 14 is a ship. In this example, the on-board radar 10 is arranged on a deck of the ship and the radar detector 12 on a mast of the ship.

The outside radar 11 belongs to a platform 16 different from the platform 14 of the on-board radar 10 and the radar detector 12.

The on-board radar 10 and the outside radar 11 are each able to emit electromagnetic signals, for example in the form of electromagnetic pulses.

The on-board radar 10 and the outside radar 11 for example comprise antennas.

The on-board radar 10 is able to emit a first emitted signal $E_1(t)$.

The outside radar 11 is able to emit a second emitted signal $E_2(t)$.

The radar detector 12 is able to receive a radar signal $S(t)$.

The radar detector 12 is configured to cover the area surrounding the platform 14 on which the radar detector 12 is arranged. Such coverage of the area defines different propagation configurations for signals arriving on the radar detector 12. The different propagation configurations depend on the installation of the radar detector 12 relative to the sources emitting signals.

The received signal $S(t)$ is the sum of a first received signal $S_1(t)$ depending on the first signal $E_1(t)$ emitted by the on-board radar 10 and a second received signal $S_2(t)$ depending on the second signal $E_2(t)$ emitted by the outside radar 11 and independent of the first emitted signal $E_1(t)$.

The first received signal $S_1(t)$ is an interfering signal with a power generally significantly higher than the power of the second received signal $S_2(t)$, which is the signal of interest.

The first received signal $S_1(t)$ can be represented by a linear combination of N elementary signals coming from the first emitted signal $E_1(t)$, also called components of the first received signal $S_1(t)$ in the continuation of the description.

The elementary signals of the linear combination correspond to the different propagation paths of a same signal emitted by the on-board radar. Each propagation path is specific to one or several propagation modes, for example, direct, diffracted, reflected, diffused or a combination of the preceding modes.

Each elementary signal is characterized by an amplitude coefficient $A_i$ and a delay $\tau_i$ relative to the corresponding emitted signal. The coefficient with amplitude $A_i$ and the delay $\tau_i$ of each elementary signal are specific to the traveled path.

The delay $\tau_i$ of each elementary signal corresponds to the ratio between the distance traveled by the elementary signal and the propagation speed of the electromagnetic waves.

The amplitude coefficient $A_i$ of each elementary signal in particular depends on the reflection and/or absorption coefficients of the element(s) found on the propagation path of the elementary signal.

In the example of FIG. 1, the reflective elements are for example the mast or deck of the ship, or the sea.

As a result, the first received signal $S_1(t)$ is for example written in the form of the following expression:

$$S_1(t) = \sum_{i=0}^{N-1} A_i E_1(t - \tau_i) \quad (1)$$

Where:
$E_1(t)$ is the first signal emitted by the on-board radar 10,
$S_1(t)$ is the first received signal corresponding to the first emitted signal $E_1(t)$ by the on-board radar 10,
N is the number of different paths followed by the first emitted signal $E_1(t)$ before reaching the detector 12,
$A_i$ is the amplitude coefficient of the elementary signal received by the detector 12 coming from the on-board radar 10 after having followed the path i, and
$\tau_i$ is the delay of the elementary signal received by the detector 12 coming from the on-board radar 10 after having followed the path i.

The second received signal $S_2(t)$ is the working signal.

As illustrated in FIG. 2, the radar detector 12 comprises at least one channel 17 for receiving an electromagnetic signal. The radar detector 12 further comprises, for the or each reception channel 17, a device 18 for eliminating, in the received signal $S(t)$, the first signal $S_1(t)$ coming from the on-board radar 10.

Each reception channel 17 comprises at least one antenna 19, a reception channel 20 and an analog-digital converter 21.

The or each antenna 19 of each reception channel 17 is able to receive the radar signal S(t).

The reception channel 20 of each reception channel 17 is configured to place the received signal S(t) at a level usable by the analog-digital converter 21 and by the elimination device 18. The reception channel 20 for example comprises an amplifier, a device for changing frequency of the received signal or a device for limiting the frequency band of the received signal.

The analog-digital converter 21 of each reception channel 17 is configured to convert analog signals received by the radar detector 12 into digital signals.

The elimination device 18 is configured to eliminate the first received signal $S_1(t)$ of the received signal S(t) by the antenna(s) of the radar detector 12 so as to keep only the received second signal $S_2(t)$.

As illustrated by FIG. 2, the elimination device 18 comprises a processor 24 comprising a data processing unit, memories and an information support reader.

The processor 24 is able to interact with a computer program product comprising a readable information medium readable by the processor 24, usually by the data processing unit of the processor 24. A computer program product comprising program instructions is stored on the readable information medium.

The computer program can be loaded on the data processing unit of the processor 24 and is suitable for driving the implementation of steps of an elimination methods that are outlined in the rest of the description.

An example operation of the elimination device 18 is now described in reference to FIG. 3, which schematically illustrates a flowchart of the implementation of a method for eliminating the signal coming from the on-board radar 10.

Initially, the elimination method comprises a step 100 for providing a replica h(t) for the first signal $E_1(t)$ emitted by the on-board radar 10.

The replica h(t) for the first emitted signal $E_1(t)$ is a sampled and digitized signal.

The replica h(t) for the first emitted signal $E_1(t)$ is for example provided in the form of a file comprising data of the first signal $E_1(t)$ by the on-board radar 10.

Alternatively, the elimination device 18 comprises, in a memory, a database of signals emitted by the on-board radar 10. Each signal of the database is referenced by a number. In this case, the provision step 100 comprises providing the number of the first signal $E_1(t)$ by the on-board radar 10.

The elimination method also comprises a step 110 for providing data relative to the replica h(t) of the first emitted signal $E_1(t)$.

In particular, the provided data comprise a sampling clock signal Hech and a synchronization signal Synch.

The sampling clock signal Hech is a signal providing the sampling frequency of the provided replica h(t).

The sampling frequency of the provided replica h(t) is for example comprised between 1 Megahertz (MHz) and 4000 MHz.

The synchronization signal Synch is a signal providing the start date, also called origin, of the replica h(t).

The synchronization signal Synch is used to synchronize the origin of the received signal S(t) with the origin of the first emitted signal $E_1(t)$.

The provision steps 100 and 110 are implemented with a frequency corresponding to the repetition period of the pulses emitted by the on-board radar 10. The repetition period of the pulses designates the duration between the leading edges of the successive pulses emitted by a same radar.

The elimination method also comprises a step 120 for receiving the signal S(t). As previously described, the received signal S(t) is the sum of the first received signal $S_1(t)$ and the second received signal $S_2(t)$.

The reception step 120 is carried out by the or each reception channel 17 of the radar detector 12.

The elimination method comprises a step 130 for processing the received signal S(t) to obtain a processed received signal $S_T(t)$.

The processing step 130 consists of sampling the received signal S(t).

The sampling of the received signal S(t) is done from the sampling clock signal Hech provided at the same sampling frequency as the provided replica h(t).

The sampling is done by the analog-digital converter 21 of the or each reception channel 17.

In the embodiment illustrated in FIG. 3, the elimination method comprises a step 140 for synchronizing the processed received signal $S_T(t)$ with the replica h(t) of the provided emitted signal $E_1(t)$ to obtain a temporal relationship.

The temporal relationship is a relationship between the origin of the processed received signal $S_T(t)$ and the origin of the replica h(t) provided for the provided emitted signal $E_1(t)$.

In particular, when the processed received signal $S_T(t)$ is a sampled signal, the temporal relationship associates each sample of the processed received signal $S_T(t)$ with a sample of the provided replica h(t). The synchronization therefore consists of numbering the samples of the replica h(t) of the first emitted signal $E_1(t)$ and the samples of the processed received signal $S_T(t)$ and associating the samples with the same number with one another.

The synchronization step is carried out by the processor 24 of the elimination device 18 using the synchronization signal Synch.

Alternatively, the provided replica h(t) and the processed received signal $S_T(t)$ are both in the form of samples spaced apart by the same temporal pitch corresponding to the period of the sampling clock signal Hech and numbered from the leading edge of the synchronization signal Synch. In this case, the synchronization step 140 is not carried out.

The elimination method comprises a step 150 for determining amplitude coefficients $A_i$ and delays $\tau_i$ of the elementary signals of the first received signal $S_1(t)$ relative to the first signal $E_1(t)$ emitted by the on-board radar 10.

In one embodiment, the determination step 150 comprises calculating a filter adapted to the signal of the on-board radar 10 from the provided replica h(t), the processed received signal $S_T(t)$ and, if applicable, the temporal relationship.

The adapted filter is a function, adapted to the provided replica h(t), making it possible to obtain extrema for the different offset moments of delays $\tau_i$ relative to the emitted signal $E_1(t)$. Such extrema correspond to the different propagation paths.

The adapted filter, in principle, causes the correlation to emerge over time between the first emitted signal $S_1(t)$ and the provided replica h(t). The values of the correlation peaks or extrema correspond to the amplitude coefficients $A_i$ of the elementary signals of the first received signal $S_1(t)$ and their position in time at the delays $\tau_i$ of said elementary signals.

As a result, if the signal received during the adapted filtering duration is a signal coming from the outside radar 11, the response at the output of the adapted filter has a low amplitude, given that the filter is not adapted to the signal emitted by the outside radar 11.

The filter adapted to the on-board radar 10 is given by the following function:

$$c(\Delta t) = \frac{\int_0^T S_T(t) \cdot [h(t - \Delta t)]^* dt}{\sqrt{\int_0^T |h(t - \Delta t)|^2 dt}} \quad (2)$$

Where:
- $c(\Delta t)$ is a function of the variable $\Delta t$,
- $h(t)$ is the replica provided for the emitted signal $E1(t)$, expressed in complex representation,
- $h(t)^*$ is the conjugated signal of the signal $h(t)$,
- $S_T(t)$ is the processed received signal expressed in complex representation,
- T is the sum of the duration of a representative pulse emitted by the on-board radar 10 and the maximum reception delay on the radar detector 12 of a pulse coming from the on-board radar 10,
- $\int_0^T X.dt$ designates the integral of X on the variable t, t varying from 0 to T,
- $|X|^2$ is the square of the modulus of X, and
- $\sqrt{X}$ is the square root of X.

As an example, FIG. 4 shows three correlation peaks obtained by the function of the adapted filter. Each peak corresponds to a coefficient pair with amplitude $A_i$ and delay $\tau_i$ of the same propagation path.

The determination step 150 further comprises a phase for comparing each amplitude coefficient $A_i$ to a predetermined threshold and eliminating elementary signals whose amplitude coefficient $A_i$ is strictly below the predetermined threshold. As a result, at the end of the determination step 150, the determined amplitude coefficients $A_i$ are greater than or equal to the predetermined threshold and the determined delays $\tau_i$ are the delays corresponding to said determined coefficients with amplitude $A_i$. Thus, the comparison to the predetermined threshold makes it possible to validate the coefficient values with amplitude $A_i$ taking a signal-to-noise ratio level into account.

The elimination method comprises a step 160 for eliminating, in the processed received signal $S_T(t)$, the first signal $S_1(t)$ so as to keep only the second received signal $S_2(t)$.

The elimination step 160 comprises a first phase for calculating a cancellation signal $S_A(t)$ from coefficients of determined amplitude $A_i$, determined delays $\tau_i$ and the provided replica $h(t)$.

Given that the on-board radar 10 sweeps the space as said radar detector 12 receives pulses, the propagation configurations at the platform 14 of the radar detector 12 may evolve from one received pulse to another. The cancellation signal is therefore specific to each pulse.

The cancellation signal $S_A(t)$ is expressed in the form of the following expression:

$$S_A(t) = \sum_{i=0}^{N-1} A_i h(t - \tau_i) \quad (5)$$

The cancellation signal $S_A(t)$ is therefore an estimate of the first received signal $S_1(t)$.

The elimination step 160 comprises a second phase for subtracting the cancellation signal $S_A(t)$, in the processed received signal $S_T(t)$ delayed by an additional delay.

The additional delay corresponds at least to the duration to implement the steps for determination and the calculation phase of the elimination step. The additional delay is for example done from a function for placing, in buffer memory, the process received signal $S_T(t)$ during the entire duration of the determination step 150 and the calculation phase of the elimination step 160.

Additionally, when several on-board radars 10 are able to disrupt the reception of the radar detectors 12, the elimination method is repeated for each on-board radar 10.

Such an elimination method is particularly suitable for real-time processing of the signals $S(t)$ received by the radar detector 12.

Furthermore, the steps implemented by the elimination device 18 can easily be carried out remotely from the radar detector 12. As a result, in one alternative, the elimination device 18 is off-board relative to the radar detector 12.

Furthermore, such an elimination method reduces the interference of the radar detector 12 while allowing the detection of working signals by the radar detector 12 in the entire frequency range accessible by the radar detector 12 and irrespective of the temporal duration of the interference.

The use of a filter adapted to the signal of the on-board radar 10 makes it possible to eliminate only the signals coming from the on-board radar 10 without affecting the working signal.

Furthermore, such an elimination method is applicable to signals coming from on-board emitters other than on-board radars.

The invention claimed is:

1. A method for eliminating in a radar signal received by a radar detector belonging to a platform, a first signal coming from at least one on-board radar belonging to the same platform, the method comprising:
   providing a replica of the signal emitted by the on-board radar;
   receiving by the radar detector a signal, the received signal being the sum of a first signal depending on the signal emitted by the on-board radar and a second signal independent of the signal emitted by the on-board radar, the first signal being able to be represented by a linear combination of elementary signals each having an amplitude coefficient and a delay relative to the signal emitted by the on-board radar;
   processing the received signal to obtain a processed received signal;
   determining the amplitude coefficients and the delays of the elementary signals of the first signal relative to the signal emitted by the on-board radar, comprising calculating a filter adapted to the signal of the on-board radar from the provided replica and the processed received signal, the adapted filter being a function whose extrema are the amplitude coefficients of the elementary signals of the first received signal; and
   eliminating, in the processed received signal, the first signal to obtain the second signal, the eliminating being carried out from the provided replica, the determined amplitude coefficients and the determined delays.

2. The method according to claim 1, wherein the delays of the elementary signals of the first signal are the times of the corresponding amplitude coefficients.

3. The method according to claim 1, wherein the filter adapted to the on-board radar is given by the following function $$c(\Delta t) = \frac{\int_0^T S_T(t) \cdot [h(t - \Delta t)]^* dt}{\sqrt{\int_0^T |h(t - \Delta t)|^2 dt}}$$

where:
- $c(\Delta t)$ is a function of the variable $\Delta t$,
- $h(t)$ is the replica provided for the emitted signal, expressed in complex representation,
- $h(t)^*$ is the conjugated signal of the signal $h(t)$,
- $S_T(t)$ is the processed received signal expressed in complex representation,
- T is the sum of the duration of a representative pulse emitted by the on-board radar and the maximum reception delay on the radar detector of a pulse coming from the on-board radar,
- $\int_0^T X.dt$ designates the integral of X on the variable t, t varying from 0 to T,
- $|X|^2$ is the square of the modulus of X, and
- $\sqrt{X}$ is the square root of X.

4. The method according to claim 1, wherein said determining comprises comparing each determined amplitude coefficient to a predetermined threshold, the selected amplitude coefficients being greater than or equal to the predetermined threshold.

5. The method according to claim 1, wherein the replica for the provided emitted signal is a signal sampled at a sampling frequency, said processing comprising sampling the received signal at the sampling frequency of the replica to obtain the processed received signal.

6. The method according to claim 1, wherein said eliminating comprises a phase for calculating a cancellation signal from the determined amplitude coefficients, the determined delays and the provided emitted signal, the cancellation signal being an estimate of the first signal.

7. The method according to claim 6, wherein said eliminating further comprises a phase for subtracting the cancellation signal, from the processed received signal delayed by an additional delay, the additional delay corresponding at least to the duration for carrying out said determining and the calculating phase of said elimination.

8. The method according to claim 1, wherein said providing, determining and eliminating are carried out for each on-board radar.

9. A radar detector belonging to a platform, the radar detector being able to carry out receiving a signal, the received signal being the sum of a first signal that depends on a signal emitted by at least one on-board radar belonging to the same platform, and a second signal independent from the signal emitted by the on-board radar, the first signal being able to be represented by a linear combination of elementary signals each having an amplitude coefficient and a delay relative to the signal emitted by the on-board radar, the radar detector comprising an elimination device in the radar signal received by the radar detector, of the first signal, said device comprising a processor able to carry out:
- processing the received signal to obtain a processed received signal,
- determining the amplitude coefficients and the delays of the elementary signals of the first signal relative to the signal emitted by the on-board radar, comprising calculating a filter adapted to the signal of the on-board radar from the provided replica and the processed received signal, the adapted filter being a function whose extrema are the amplitude coefficients of the elementary signals of the first received signal, and
- eliminating, in the processed received signal, the first signal to obtain the second signal, the eliminating being carried out from the provided replica, the determined amplitude coefficients and the determined delays.

* * * * *